(12) United States Patent
Kupeev et al.

(10) Patent No.: US 7,146,048 B2
(45) Date of Patent: Dec. 5, 2006

(54) REPRESENTATION OF SHAPES FOR SIMILARITY MEASURING AND INDEXING

(75) Inventors: Konstantin Kupeev, Haifa (IL); Zohar Sivan, Zichron Yaacov (IL)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 09/927,351

(22) Filed: Aug. 13, 2001

(65) Prior Publication Data

US 2003/0059116 A1    Mar. 27, 2003

(51) Int. Cl.
*G06K 9/46* (2006.01)
(52) U.S. Cl. ...................................... 382/203; 382/218
(58) Field of Classification Search ................ 382/190, 382/195, 199, 203, 209, 217, 218, 176; 707/101, 707/102; 700/100
See application file for complete search history.

(56) References Cited

U.S. PATENT DOCUMENTS 5,841,900 A * 11/1998 Rahgozar et al. ........... 382/176
5,953,229 A *  9/1999 Clark et al. ................. 700/100

OTHER PUBLICATIONS

K. Kupeev et al., "A New Method of Estimating Shape Similarity", *Pattern Recognition Letters*, 1996, p. 873-887, 17:8.

* cited by examiner

*Primary Examiner*—Samir Ahmed
(74) *Attorney, Agent, or Firm*—Browdy and Neimark, PLLC (57) ABSTRACT

A method for analyzing an image includes constructing a graph to represent an object appearing in the image, and generating a string of symbols corresponding to the graph. The string is processed so as to classify the object.

36 Claims, 3 Drawing Sheets

REPRESENTATION OF SHAPES FOR SIMILARITY MEASURING AND INDEXING

FIELD OF THE INVENTION

The present invention relates generally to computer image recognition, and specifically to methods for identifying similarities between shapes appearing in images analyzed by computer.

BACKGROUND OF THE INVENTION

Human beings generally have little problem in recognizing "perceptual similarity" between different shapes. For example, people can easily tell that chairs in different sizes and styles are all chairs, or that instances of a letter written in different fonts or handwriting are all the same letter. This type of qualitative recognition is considerably more difficult to carry out by computer. There has been a great deal of research done on algorithms that computers can use to recognize and classify different shapes, but no one has yet found a generic method for shape classification that can approach the speed and reliability of human perception.

A useful method for computerized shape comparison is described by Kupeev and Wolfson in an article entitled, "A New Method of Estimating Shape Similarity," published in *Pattern Recognition Letters* 17:8 (1996), pages 873–887, which is incorporated herein by reference. The authors introduce the notion of a G-graph G(K), which represents a geometrical structure of a contour K and the locations and sizes of "lumps" formed by the contour relative to the axes of a Cartesian frame. Contours that are similar will have G-graph representations that are either isomorphic or can be reduced to isomorphism by a technique described in the article. The authors present a method for computing a similarity distance between the contours, based on "trimming the leaves" of the G-graphs to generate a sequence of isomorphic pairs of graphs. This procedure is repeated for multiple, different relative orientations of the contours being compared. The similarity of the contours is determined by the minimum of the distance of the graphs over all the orientations.

The G-graph method was found by the authors to give good results when applied to recognizing arbitrary, freehand letters and other shapes. The method is computationally efficient and gives good recognition results as compared with other methods known in the art for automated shape comparison. The major computational cost of the method has to do with manipulation of the G-graphs themselves for calculating isomorphism.

SUMMARY OF THE INVENTION

Preferred embodiments of the present invention provide a novel technique for representing graphs as strings of symbols. The string representation is such that when it is applied to oriented, acyclic graphs, such as G-graphs, a pair of graphs will be found to be isomorphic if and only if the corresponding strings are identical. Extending this technique, the sequence of isomorphic pairs of G-graphs used by Kupeev and Wolfson to find similarities between different shapes can be represented instead as a pair of vectors, wherein each vector element is a string. Using this representation, shapes can be classified and compared simply using string arithmetic, thus avoiding the complication and computational cost of manipulating the G-graphs themselves.

There is therefore provided, in accordance with a preferred embodiment of the present invention, a method for analyzing an image, including:

constructing a graph to represent an object appearing in the image;

generating a string of symbols corresponding to the graph; and processing the string so as to classify the object.

Preferably, generating the string includes generating first and second strings to represent first and second graphs, respectively, so that the first and second strings are identical if and only if the first and second graphs are isomorphic. The graphs include vertices, and constructing the graph preferably includes constructing the first and second graphs so that the vertices of each of the graphs are arranged in a specified spatial relation, and generating the first and second strings preferably includes constructing the strings so as to reflect the spatial relation of the vertices. Further preferably, constructing the graph includes assigning the vertices to represent respective portions of a contour of a shape of the object in the image, and arranging the vertices in the specified spatial relation responsive to relative positions in the image of the respective portions of the contour. Most preferably, assigning the vertices includes positioning Cartesian coordinate axes relative to the contour and determining the relative positions of the portions of the contour with respect to the axes, and wherein arranging the vertices includes positioning the vertices so as to preserve up/down and left/right relations of the positions of the portions of the contour.

Additionally or alternatively, constructing the graph includes dividing a contour of a shape of the object in the image into multiple portions, and assigning vertices of the graph respectively to represent the portions of the contour. Preferably, dividing the contour includes positioning Cartesian coordinate axes relative to the contour at a plurality of different orientation angles, and finding the portions of the contour at each of the angles, and constructing the graph includes constructing a plurality of respective graphs in which the vertices represent the portions of the contour at the different orientation angles, and generating and processing the string include generating and processing a plurality of strings corresponding to the respective graphs so as to classify the shape.

Further preferably, constructing the graph includes constructing a sequence of graphs that correspond to successively simplified versions of the contour and accordingly include successively decreasing numbers of the vertices, and generating and processing the string include generating and processing a plurality of strings corresponding to the graphs in the sequence so as to classify the shape. Most preferably, processing the plurality of the strings includes arranging the strings as elements of a first vector, indexed according to the numbers of the vertices in the corresponding graphs, and computing a measure of distance between the first vector and a second vector, representing a reference contour and indexed in like manner to the first vector, so as to determine a similarity of the shape to the reference contour.

Preferably, generating the string of symbols includes performing a depth-first search over the vertices of the graph, and adding one or more symbols to the string for each edge encountered in the search.

In a preferred embodiment, processing the string includes comparing the string to a reference string representing a reference object so as to assess a similarity of the object to the reference object. Preferably, comparing the string includes computing a string distance between the string and the reference string, so as to calculate a measure of shape difference between the object and the reference object.

There is also provided, in accordance with a preferred embodiment of the present invention, apparatus for analyzing an image, including an image processor, arranged to construct a graph to represent an object appearing in the image, to generate a string of symbols corresponding to the graph, and to process the string so as to classify the object.

There is additionally provided, in accordance with a preferred embodiment of the present invention, a computer software product, including a computer-readable medium in which program instructions are stored, which instructions, when read by a computer, cause the computer to construct a graph to represent an object appearing in an image, to generate a string of symbols corresponding to the graph, and to process the string so as to classify the object.

The present invention will be more fully understood from the following detailed description of the preferred embodiments thereof, taken together with the drawings in which:

DETAILED DESCRIPTION OF PREFERRED EMBODIMENTS

Figure 1:
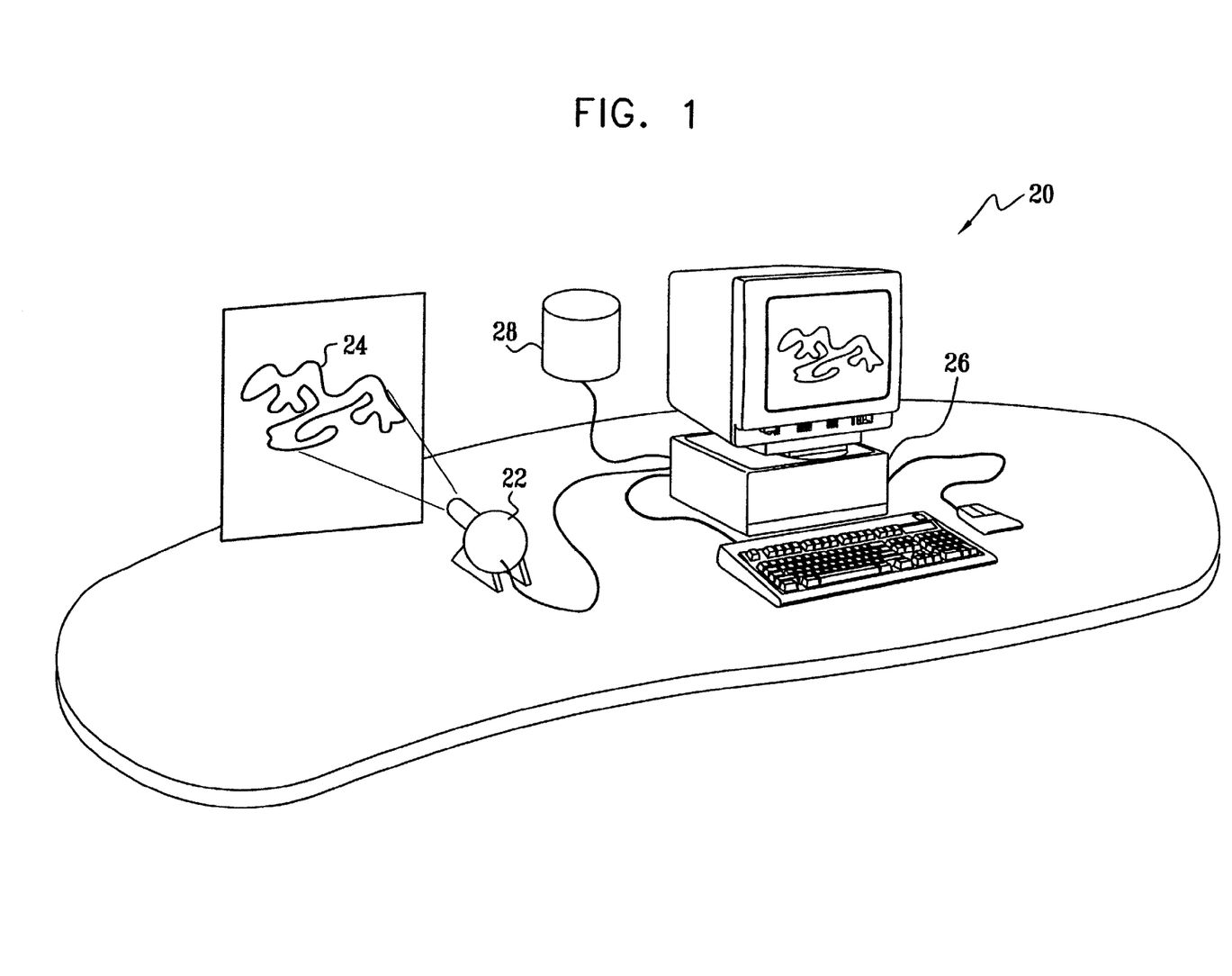
FIG. 1 is a schematic pictorial illustration of a system for shape classification, in accordance with a preferred embodiment of the present invention.

FIG. 1 is a schematic pictorial illustration of apparatus 20 for shape classification, in accordance with a preferred embodiment of the present invention. An image capture device 22, such as a digital camera or scanner, captures an electronic image containing a shape 24 of some object of interest. Typically, shape 24 appears in the captured image as a two-dimensional contour corresponding to the outline of the two-or three-dimensional object. An image processor 26 receives the electronic image from device 22 or from another source, such as a memory 28 or a network (not shown) Processor 26 generates strings of symbols that represents shape 24, as described in detail hereinbelow, and uses the strings to classify the shape.

Processor 26 typically comprises a general-purpose computer, running image analysis software that implements the methods of the present invention. This software may be downloaded to the computer in electronic form, over a network, for example, or it may alternatively be furnished on tangible media, such as CD-ROM or non-volatile memory. Further alternatively, at least some of the functions of processor 26 may be implemented in dedicated hardware.

Figure 2A:
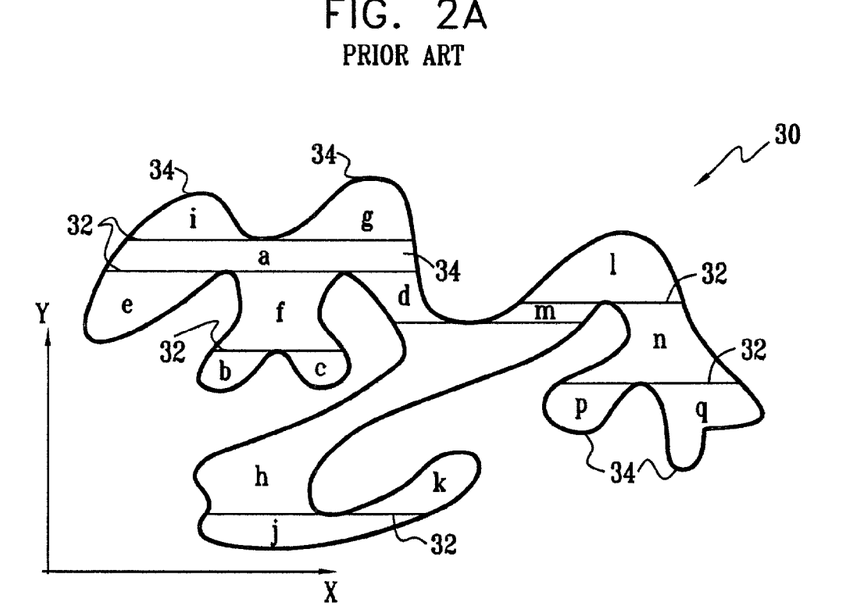
FIG. 2A is a schematic plot of an arbitrary contour, illustrating division of the contour into "lumps" for the purpose of finding a G-graph that represents the contour.

FIG. 2A is a schematic representation of an arbitrary contour 30 (corresponding roughly to the outline of shape 24), taken from the above-mentioned article by Kupeev and Wolfson. Contour 30 is shown here to illustrate the construction of a G-graph. Referring to contour 30 as K, a segmentation E(K) of the contour is constructed by drawing straight lines 32 parallel to the X-axis and tangent to the contour. Other segmentations can be obtained by rotating the Cartesian axes relative to the contour. Lines 32 divide the region inside the contour into "lumps" 34. The lumps in the figure are labeled a, b, c, . . . , p, q. Lumps that have more than one point in common are called adjacent. Given any two adjacent lumps, the one with the higher Y-coordinate is considered the parent, and the lower is the child. Lumps of the same generation can be classified according to their relative X-coordinates. A lump that is adjacent to only one other lump is called a leaf.

Figure 2B:
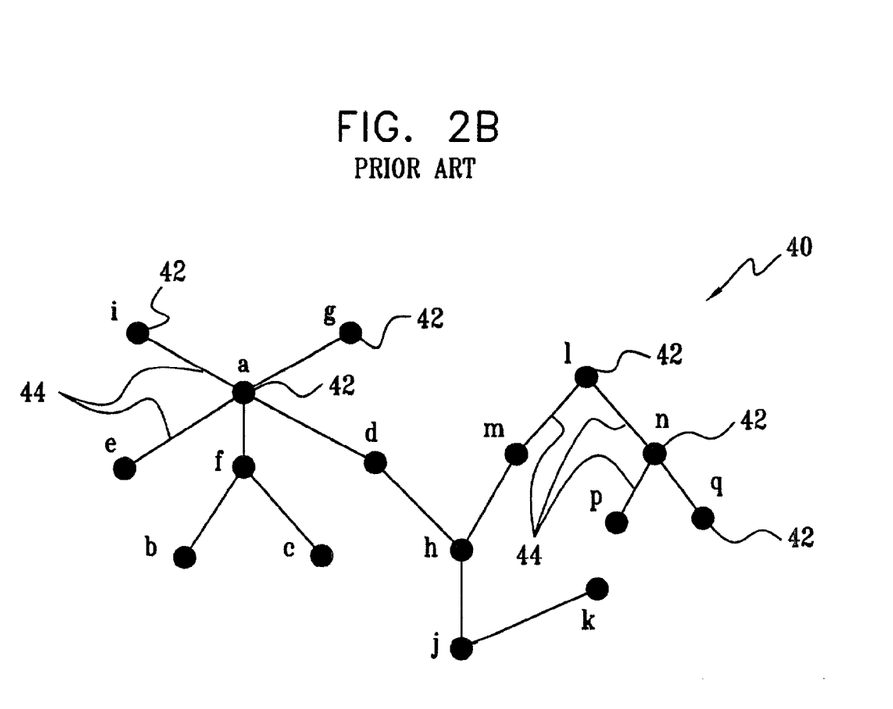
FIG. 2B is a G-graph representing the contour of FIG. 2A.

FIG. 2B is a G-graph 40, G(K), corresponding to segmentation E(K) of contour 30. Vertices 42 of graph 40 correspond to lumps 34 of contour 30, while edges 44 indicate the adjacency relations between the lumps. A weight is assigned to each of vertices 42 depending on the area or height of the corresponding lump 34. Two G-graphs are considered to be isomorphic if there is a graph isomorphism between them that preserves the parent/child and left/right relations of the vertices. G-graph isomorphism has been found empirically to be a good indicator of "perceptual similarity" of the corresponding contours. This isomorphism is preserved under translation of the contours to which the G-graphs correspond, but not rotation. In order to compare two shapes whose relative orientation angles are unknown, the G-graphs should be constructed and assessed at multiple different angles of relative rotation of the shapes.

Figure 3:
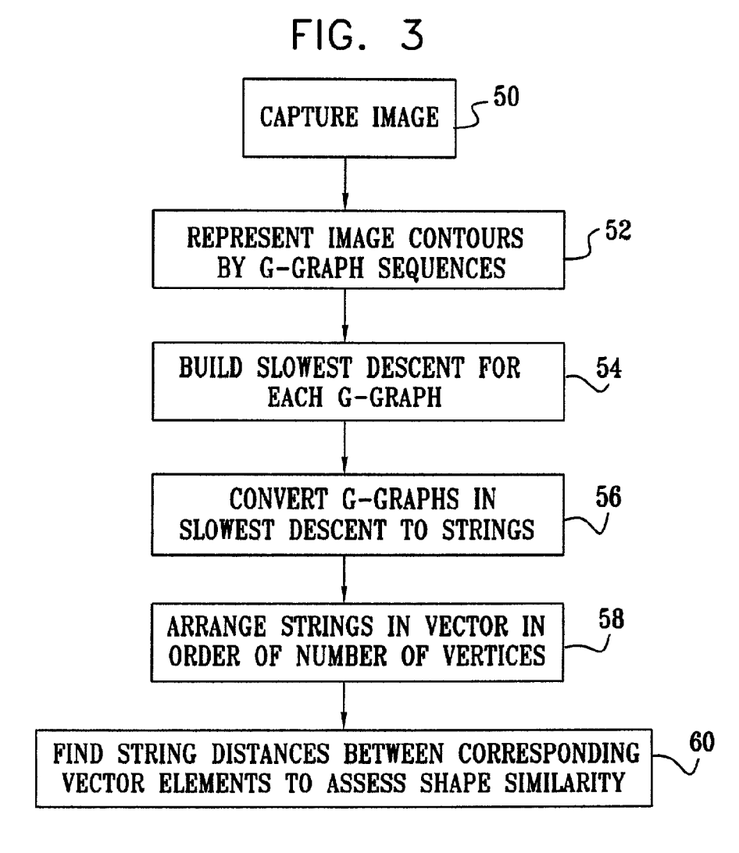
FIG. 3 is a flow chart that schematically illustrates a method for classifying a shape in an image, in accordance with a preferred embodiment of the present invention.

FIG. 3 is a flow chart that schematically illustrates a method for comparing two shapes, in accordance with a preferred embodiment of the present invention. For the sake of example, it is assumed that a sample contour K is captured by device 22, at an image capture step 50, and is to be compared by processor 26 with a reference contour L stored in memory 28. Each of the contours represents the shape of a corresponding object captured at a certain orientation. It will be understood, however, that the methods described herein may be applied to shapes and contours that are captured by or input to processor 26 by any means whatsoever.

In order to compare contours K and L, a sequence of G-graphs VG is constructed corresponding to each of the shapes, at a graph construction step 52. A sequence of contours $K_2, K_2, \ldots, K_N$ is defined, wherein each $K_i$ is the contour K rotated by the angle $2\pi(i-1)/N$. (Thus, $K_1=K$.) Typically, N=16. For each $K_i$, the corresponding G-graph $G_i(K)$ is constructed, as described above. $VG(K)=G_1(K), G_2(K), \ldots, G_N(K)$ thus represents the contour K the full range of possible rotation angles, and likewise, VG(L) represents L.

Typically, the G-graphs $G_i(K)$ and $G_i(L)$ are not isomorphic. In order to determine the similarity between the G-graphs, based on a measure of distance defined below, each of the G-graphs is processed, at a slowest descent step 54, to build a sequence of G-graphs with successively lower numbers of vertices. Similar (though not identical) contours will exhibit isomorphism of at least the G-graphs in the respective sequences that have low numbers of vertices. This isomorphism of the low-order graphs is used to measure a "distance" between the original contours K and L, as described below.

The slowest-descent sequence D (G) for a given G-graph G is $D(G)=G^{(1)} \to G^{(2)} \to \ldots \to G^{(n)}$, wherein $G^{(1)}=G$, and each successive $G^{(j+1)}$ is simplified, relative to the preceding $G^{(j)}$, by removing the leaf of minimum weight in $G^{(j)}$. This corresponds to removing the lump (leaf) of minimum weight in the contour. Each G-graph in the sequence D(G) has fewer vertices than the preceding one. (In fact, each leaf trimmed may result in removing more than one vertex from the graph $G^{(j)}$ in order to arrive at $G^{(j+1)}$. Considering contour 30 and graph 40 in FIGS. 2A and 2B, for example, removal of vertex c and its corresponding lump causes lumps b and f to merge into one, so that vertex b is also eliminated from the graph. Further details regarding computation of slowest-descent sequences are presented in the above-mentioned article by Kupeev and Wolfson.) The final graph in the sequence, $G^{(n)}$, consists of a single vertex.

As noted above, D(G) is computed for each $G_i(K)$ and $G_i(L)$ in VG(K) and VG(L), respectively. The shape similarity measure introduced by preferred embodiments of the present invention implies that the G-graphs convey sufficient information about the shapes they represent to make a valid shape comparison, without regard to the weights of the vertices of the graphs. This implication is true if the weights of the graphs belonging to the slowest descent sequence are sufficiently large. To achieve this purpose, some of the graphs are preferably removed from the beginning of the slowest descent sequence, most preferably by applying a threshold procedure to the weights of the leaves removed at each stage of the descent.

Each of the graphs $G^{(j)}$ in D(G) for each $G_i(K)$ and $G_i(L)$ is mapped to a string $str(G^{(j)})$, at a string conversion step 56. The mapping is such that any two G-graphs $G^{(j)}$ and $H^{(k)}$ are isomorphic if and only if $str(G^{(j)})=str(H^{(k)})$ Isomorphism is defined here as G-graph isomorphism, i.e., that the parent/child and left/right relations between the corresponding nodes are identical. Step 56 comprises two stages: first, selection of a reference vertex among the vertices in the graph, and second, construction of the string.

Figure 4:
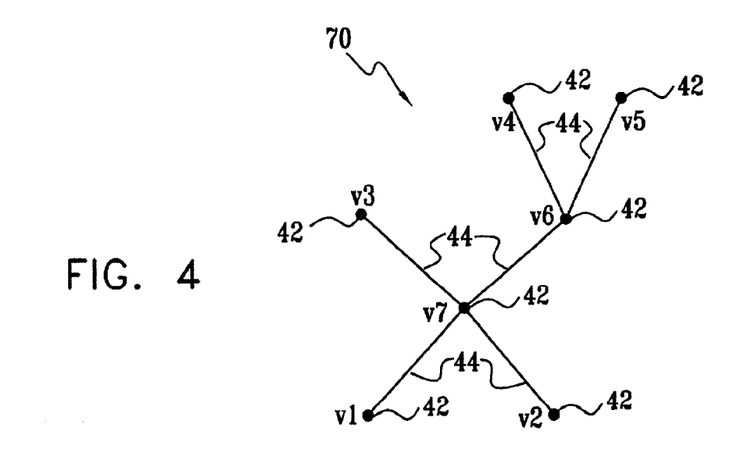
FIG. 4 is a G-graph used to exemplify the method of FIG. 3.

As an aid in understanding step 56, reference is now made to FIG. 4, which shows an exemplary G-graph 70 corresponding to an arbitrary $G^{(j)}$ in D(G). Vertices 42 of graph 70 are labeled v1, v2, . . . , v7. The reference vertex of the graph is chosen by iteratively removing all of the leaves from the graph until only one or two vertices remain. This results in removal of vertices v1 through v5, leaving only v6 and v7. (In the case of graph 40, in FIG. 2B, vertices b, c, e, i, g, k, p and q would first be removed, followed by f, j and n in the next iteration, and so forth until only vertex h is left.) When only one vertex is left after all of the leaves have been removed, it is chosen as the reference vertex. When two vertices are left, as in the case of graph 70, the upper vertex is chosen as the reference vertex. Thus, v6 is the reference vertex in graph 70.

To construct the string corresponding to $G^{(j)}$, a recursive depth-first search (DFS) is conducted over the graph, beginning from the reference vertex. Each time a new vertex in the graph is reached, the DFS visits its parents in left-to-right order, followed by its children in left-to-right order. The search continues until it has visited all of the nodes and returned to the reference vertex. On graph 70, the DFS will visit the vertices in the following order: v6, v4, v6, v5, v6, v7, v3, v7, v1, v7, v2, v7, v6.

As it explores the edges connected to a given vertex V, the DFS yields symbols corresponding to the configuration of the edges. Let vp be the vertex on the search route that preceded the first appearance of the current vertex v. The search yields a sequence of the symbols e, f, b and d, whose significance is as follows:

If the edge (vp,v) is re-encountered in searching at v→yield e.
If a new edge is traversed→yield f.
If an edge is traversed for a second time→yield b.
When v has children, and the routes over all of the parents of v have been completely searched→yield d.
When v has no children and no parents (i.e., the graph consists of only one vertex)→yield d.

Returning to the example of graph 70, the following symbols will be generated:

| Search step(s) | Symbol |
| --- | --- |
| v6 → v4 | New edge → f |
| v4 has no parents | Parents done → d |
| Check children of v4 | Edge (v6, v4) re-encountered → e |
| v4 → v6 | Revisited edge → b |
| v6 → v5 → v6 | f, d, e, b, as for visit to v4 |
| v6 parents done | Parents done → d |
| v6 → v7 | New edge → f |
| v7 → v3 → v7 | f, d, e, b, as for visit to v4 |
| Next parent is v6 | Edge (v6, v7) re-encountered → e |
| v7 parents done | Parents done → d |
| v7 → v1 | New edge → f |
| Check parents of v1 | Edge (v7, v1) re-encountered → e |
| v1 → v7 | Revisited edge → b |
| v7 → v2 → v7 | f, e, b, as for visit to v1 |
| v7 → v6 | Revisited edge → b |

Thus at step 56, the following string would be returned corresponding to graph 70: fdebfdebdffdebedfebfebb. Note that the steps v7→v1→v7 and v7→v2→v7 do not yield d because nodes v1 and v2 have no children. Also, the final search step v7→v6 corresponds to completion of the DFS of v6, and is not part of the DFS of v7. Therefore e is not yielded again before this step.

The strings corresponding to all of the graphs $G^{(j)}$ in the slowest-descent sequences D(G), for all of the G-graphs $G_i(K)$ and $G_i(L)$, are arranged in respective vectors V(G), at a vector representation step 58. Each string becomes a single vector element of V(G). The vector elements are arranged in consecutive, ascending order of the number of vertices in the corresponding graphs $G^{(j)}$. Thus, $str(G^{(n)})$, with a single vertex, is the first element of V(G), and so on up to the last element, $str(G^{(1)})$. As noted above, the number of vertices in the graphs $G^{(j)}$ in D(G) decreases monotonically with increasing j, but not necessarily in increments of one vertex. Therefore, in constructing V(G), when for a certain number k in the range 1<k<|G| (wherein |G| is the number of vertices in G), there is no graph $G^{(j)}$ with k vertices, the string "x" is inserted in the vector instead as element $V_k$. Thus, for example, when there are no graphs with two or four vertices, the slowest-descent vector has the form:

$$V(G) = \begin{pmatrix} str(G^{(n)}) \\ x \\ str(G^{(n-1)}) \\ x \\ str(G^{(n-2)}) \\ str(G^{(n-3)}) \\ \vdots \\ str(G^{(1)}) \end{pmatrix} \quad (1)$$

The vector V(G) consists of |G| elements. In the distance computation described below, however, it is preferable to consider vectors V'(G) that are of fixed length m. The choice of m reflects the tradeoff between computational complexity and the quality of the distance measure. If |G|=m, then V'(G)=V(G). If |G|<m, then V'(G) is constructed by augmenting V(G) with elements of value "x", up to a total of m elements. If |G|>m, then V(G) is truncated by removal of elements starting from $str(G^{(1)})$, until only m elements remain. In the description that follows, for the sake of simplicity, we continue to use the notation V(G) in place of V'(G).

Now, to compare G-graphs $G_i(K)$ and $G_i(L)$, a scalar distance is computed between the corresponding vectors $V(G_i(K))$ and $V(G_i(L))$, at a distance computation step 60. For this purpose, a string distance is defined between the kth element in vector V(G), $V_k(G)$, and the corresponding kth element in vector V(H), $V_k(H)$, as follows:

$$\text{dist}(V_k(G), V_k(H)) = \begin{cases} 0 & V_k(G) = V_k(H) \\ 1 & V_k(G) \neq V_k(H) \end{cases} \quad (2)$$

The distance between graphs G and H, DIST(G,H) is defined as the average of the string distances dist($V_k(G),V_k(H)$) over all k.

Finally, a similarity distance CDIST between contours K and L is determined by finding the distances DIST between the corresponding graphs $G_i(K)$ and $G_i(L)$ (as defined at step 52) to give:

$$\text{CDIST}(K, L) = \frac{1}{N}\sum_{i=1}^{N}\text{DIST}(G_i(K), G_i(L)) \quad (3)$$

Similar contours K and L will be characterized by a small value of CDIST. The similarity distance between the actual shapes that gave rise to the contours K and L can be estimated by rotating one of the contours relative to the other and repeating the computation of CDIST, in order to find the orientation that gives the best match. In other words, the actual shape distance is given by $\min_i\{\text{CDIST}(K, L_i)\}$. Preferably, a "proper contour directions" technique, as described by Kupeev and Wolfson in the above-mentioned article, is used to choose the orientations to be tested and thus to reduce the complexity of the distance calculation. Processor 26 (FIG. 1) can conveniently classify contour K and its corresponding shape as belonging to one shape type or another, by finding the contour and shape distances of K from multiple different reference contours stored in memory 28. The image that is captured of the shape is typically indexed according to the reference contour or contours that give the smallest values of the distance.

Although the preferred embodiments described above are directed to shape classification and comparison, the principles of the present invention may also be applied to solve graph problems of other types. For example, attributed relational graphs (ARGs) are a wide class of objects used in computer vision and pattern recognition. Roughly speaking, these are graphs whose vertices correspond to the features detected in the image (such as corners), while the edges indicate relations among the features. Attributes, such as labels or weights, are assigned to the vertices and/or edges. When the spatial relations among the vertices and edges of the ARGs are well defined, these ARGs may be represented by strings and manipulated in the ways described above.

Furthermore, although preferred embodiments described herein use certain particular symbols, and assign specific meanings to these symbols for creating string representations of graphs, alternative schemes for representing graphs as strings that preserve isomorphism will be apparent to those skilled in the art and are considered to be within the scope of the present invention. Similarly, while the methods described by Kupeev and Wolfson for converting arbitrary contours to G-graphs and generating slowest-descent sequences of G-graphs have been found to be useful in these preferred embodiments, the principles of the present invention may likewise be applied using other methods to represent contours as graphs and to arrange the graphs for processing.

Moreover, although the preferred embodiments described herein are applied explicitly to two-dimensional contours, the principles of the present invention may also be extended to compare and classify contours in n-dimensional space, $n \geq 3$. For example, a description D(K) of an n-dimensional contour K may be reduced to an (n−1)-dimensional case by slicing K by parallel (n−1)-dimensional planes $P_1, P_2, \ldots, P_u, \ldots, P_U$. Let each $P_U$ intersect K by f(u) contours, K(u,1), K(u,2), . . . , K(u,f(u)), each of dimension n−1. D(K) can then be defined and processed as a family of descriptions $\{D(K(*,*))\}$, wherein D(K(u,j)) is the representation of the (n−1)-dimensional contour K(u,j). The natural adjacency relation between contours K(*,*) belonging to adjacent planes can be incorporated in processing D(K).

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for analyzing an image, comprising:
constructing a graph to represent an object appearing in the image,
wherein the object has a shape, and the graph comprises vertices connected by edges and arranged in a spatial relation responsive to the shape;
mapping the graph to a string by traversing the edges of the graph and for each edge traversed,
adding to the string a character from a four-letter alphabet in which each character is indicative of whether the edge is re-encountered, whether a new edge is traversed, whether one of said edges is traversed for a second time, and whether there are no children and no parents and
processing the string so as to classify the object.

2. A method according to claim 1, wherein mapping the graph comprises
generating first and second strings to represent first and second graphs, respectively, so that the first and second strings are identical if and only if the first and second graphs are isomorphic.

3. A method according to claim 2, wherein the graphs comprise vertices, and wherein constructing the graph comprises constructing the first and second graphs so that the vertices of each of the graphs are arranged in a specified spatial relation, and wherein generating the first and second strings comprises constructing the strings so as to reflect the spatial relation of the vertices.

4. A method according to claim 3, wherein constructing the graph comprises assigning the vertices to represent respective portions of a contour of a shape of the object in the image, and arranging the vertices in the specified spatial relation responsive to relative positions in the image of the respective portions of the contour.

5. A method according to claim 4, wherein assigning the vertices comprises positioning Cartesian coordinate axes relative to the contour and determining the relative positions of the portions of the contour with respect to the axes, and wherein arranging the vertices comprises positioning the vertices so as to preserve up/down and left/right relations of the positions of the portions of the contour.

6. A method according to claim 1, wherein constructing the graph comprises dividing a contour of a shape of the object in the image into multiple portions, and assigning vertices of the graph respectively to represent the portions of the contour.

7. A method according to claim 6, wherein dividing the contour comprises positioning Cartesian coordinate axes relative to the contour at a plurality of different orientation angles, and finding the portions of the contour at each of the angles, and
wherein constructing the graph comprises constructing a plurality of respective graphs in which the vertices represent the portions of the contour at the different orientation angles, and
wherein generating and processing the string comprise generating and processing a plurality of strings corresponding to the respective graphs so as to classify the shape.

8. A method according to claim 6, wherein constructing the graph comprises constructing a sequence of graphs that correspond to successively simplified versions of the contour and accordingly comprise successively decreasing numbers of the vertices, and
wherein generating and processing the string comprise generating and processing a plurality of strings corresponding to the graphs in the sequence so as to classify the shape.

9. A method for analyzing an image, comprising:
constructing a graph to represent an object appearing in the image;
generating a string of symbols corresponding to the graph; and
processing the string so as to classify the object,
wherein constructing the graph comprises dividing a contour of a shape of the object in the image into multiple portions, and assigning vertices of the graph respectively to represent the portions of the contour,
wherein constructing the graph comprises constructing a sequence of graphs that correspond to successively simplified versions of the contour and accordingly comprise successively decreasing numbers of the vertices,
wherein generating and processing the string comprise generating and processing a plurality of strings corresponding to the graphs in the sequence so as to classify the shape, and
wherein processing the plurality of the strings comprises arranging the strings as elements of a first vector, indexed according to the numbers of the vertices in the corresponding graphs, and computing a measure of distance between the first vector and a second vector, representing a reference contour and indexed in like manner to the first vector, so as to determine a similarity of the shape to the reference contour.

10. A method according to claim 1, wherein mapping the graph comprises
performing a depth-first search over the vertices of the graph, and adding one or more symbols to the string for each edge encountered in the search.

11. A method according to claim 1, wherein processing the string comprises comparing the string to a reference string representing a reference object so as to assess a similarity of the object to the reference object.

12. A method according to claim 11, wherein comparing the string comprises computing a string distance between the string and the reference string, so as to calculate a measure of shape difference between the object and the reference object.

13. Apparatus for analyzing an image, comprising
an image processor, arranged to construct a graph to represent an object appearing in the image,
wherein the object has a shape, and the graph comprises vertices connected by edges and arranged in a spatial relation responsive to the shape, to map the graph to a string by traversing the edges of the graph and for each edge traversed, adding to the string a character from a four-letter alphabet in which each character is indicative of whether the edge is re-encountered, whether a new edge is traversed, whether one of said edges is traversed for a second time, and whether there are no children and no parents, and to process the string so as to classify the object.

14. Apparatus according to claim 13, wherein the processor is arranged to generate first and second strings to represent first and second graphs, respectively, so that the first and second strings are identical if and only if the first and second graphs are isomorphic.

15. Apparatus according to claim 14, wherein the graphs comprise vertices, and wherein the processor is arranged to construct the first and second graphs so that the vertices of each of the graphs are arranged in a specified spatial relation, and to generate the first and second strings so as to reflect the spatial relation of the vertices.

16. Apparatus according to claim 15, wherein the processor is adapted to assign the vertices to represent respective portions of a contour of a shape of the object in the image, and to arrange the vertices in the specified spatial relation responsive to relative positions in the image of the respective portions of the contour.

17. Apparatus according to claim 16, wherein the processor is arranged to position Cartesian coordinate axes relative to the contour and to determine the relative positions of the portions of the contour with respect to the axes, and to position the vertices so as to preserve up/down and left/right relations of the positions of the portions of the contour.

18. Apparatus according to claim 13, wherein the processor is arranged to divide a contour of a shape of the object in the image into multiple portions, and to assign vertices of the graph respectively to represent the portions of the contour.

19. Apparatus according to claim 18, wherein the processor is arranged to position Cartesian coordinate axes relative to the contour at a plurality of different orientation angles and to find the portions of the contour at each of the angles, and is further arranged to construct a plurality of respective graphs in which the vertices represent the portions of the contour at the different orientation angles, so as to generate and process a plurality of strings corresponding to the respective graphs for use in classifying the shape.

20. Apparatus according to claim 18, wherein the processor is arranged to construct a sequence of graphs that correspond to successively simplified versions of the contour and accordingly comprise successively decreasing numbers of the vertices, and to generate and process a plurality of strings corresponding to the graphs in the sequence for use in classifying the shape.

21. Apparatus for analyzing an image, comprising an image processor, arranged to construct a graph to represent an object appearing in the image, to generate a string of symbols corresponding to the graph, and to process the string so as to classify the object, wherein the processor is arranged to divide a contour of a shape of the object in the image into multiple portions, and to assign vertices of the graph respectively to represent the portions of the contour, wherein the processor is arranged to construct a sequence of graphs that correspond to successively simplified versions of the contour and accordingly comprise successively decreasing numbers of the vertices, and to generate and process a plurality of strings corresponding to the graphs in the sequence for use in classifying the shape, and wherein the processor is adapted to arrange the strings as elements of a first vector, indexed according to the numbers of the vertices in the corresponding graphs, and to compute a measure of distance between the first vector and a second vector, representing a reference contour and indexed in like manner to the first vector, so as to determine a similarity of the shape to the reference contour.

22. Apparatus according to claim 13, wherein
the processor is arranged to generate the string of symbols by performing a depth-first search over the vertices of the graph, and adding one or more symbols to the string for each edge encountered in the search.

23. Apparatus according to claim 13, wherein the processor is arranged to compare the string to a reference string representing a reference object so as to assess a similarity of the object to the reference object.

24. Apparatus according to claim 23, wherein the processor is arranged to compare the string by computing a string distance between the string and the reference string, so as to calculate a measure of shape difference between the object and the reference object.

25. A computer software product, comprising a computer-readable medium in which program instructions are stored, which instructions, when read by a computer, cause the computer to construct a graph to represent an object appearing in an image, wherein the object has a shape, and the graph comprises vertices connected by edges and arranged in a spatial relation responsive to the shape, to map the graph to a string by traversing the edges of the graph and for each edge traversed, adding to the string a character from a four-letter alphabet in which each character is indicative of whether the edge is re-encountered, whether a new edge is traversed, whether one of said edges is traversed for a second time, and whether there are no children and no parents and to process the string so as to classify the object.

26. A product according to claim 25, wherein the instructions cause the computer to generate first and second strings to represent first and second graphs, respectively, so that the first and second strings are identical if and only if the first and second graphs are isomorphic.

27. A product according to claim 26, wherein the graphs comprise vertices, and wherein the instructions cause the computer to construct the first and second graphs so that the vertices of each of the graphs are arranged in a specified spatial relation, and to generate the first and second strings so as to reflect the spatial relation of the vertices.

28. A product according to claim 27, wherein the instructions cause the computer to assign the vertices to represent respective portions of a contour of a shape of the object in the image, and to arrange the vertices in the specified spatial relation responsive to relative positions in the image of the respective portions of the contour.

29. A product according to claim 28, wherein the instructions cause the computer to position Cartesian coordinate axes relative to the contour and to determine the relative positions of the portions of the contour with respect to the axes, and to position the vertices so as to preserve up/down and left/right relations of the positions of the portions of the contour.

30. A product according to claim 25, wherein the instructions cause the computer to divide a contour of a shape of the object in the image into multiple portions, and to assign vertices of the graph respectively to represent the portions of the contour.

31. A product according to claim 30, wherein the instructions cause the computer to position Cartesian coordinate axes relative to the contour at a plurality of different orientation angles and to find the portions of the contour at each of the angles, and further cause the computer to construct a plurality of respective graphs in which the vertices represent the portions of the contour at the different orientation angles, so as to generate and process a plurality of strings corresponding to the respective graphs for use in classifying the shape.

32. A product according to claim 30, wherein the instructions cause the computer to construct a sequence of graphs that correspond to successively simplified versions of the contour and accordingly comprise successively decreasing numbers of the vertices, and to generate and process a plurality of strings corresponding to the graphs in the sequence for use in classifying the shape.

33. A computer software comprising
a computer-readable medium in which program instructions are stored, which instructions, when read by a computer, cause the computer to construct a graph to represent an object appearing in an image, to generate a string of symbols corresponding to the graph, and to process the string so as to classify the object, wherein the instructions cause the computer to divide a contour of a shape of the object in the image into multiple portions, and to assign vertices of the graph respectively to represent the portions of the contour, wherein the instructions cause the computer to construct a sequence of graphs that correspond to successively simplified versions of the contour and accordingly comprise successively decreasing numbers of the vertices, and to generate and process a plurality of strings corresponding to the graphs in the sequence for use in classifying the shape, and wherein the instructions cause the computer to arrange the strings as elements of a first vector, indexed according to the numbers of the vertices in the corresponding graphs, and to compute a measure of distance between the first vector and a second vector, representing a reference contour and indexed in like manner to the first vector, so as to determine a similarity of the shape to the reference contour.

34. A product according to claim 25,
wherein the instructions cause the computer to generate the string of symbols by performing a depth-first search over the vertices of the graph, and adding one or more symbols to the string for each edge encountered in the search.

35. A product according to claim 25, wherein the instructions cause the computer to compare the string to a reference string representing a reference object so as to assess a similarity of the object to the reference object.

36. A product according to claim 35, wherein the instructions cause the computer to compare the string by computing a string distance between the string and the reference string, so as to calculate a measure of shape difference between the object and the reference object.

* * * * *